Patented Feb. 3, 1953

2,627,527

UNITED STATES PATENT OFFICE 2,627,527

OXIDATION OF OLEFINS TO ALKENALS

Gerald C. Connolly, Elizabeth, and Delmer L. Cottle, Highland Park, N. J., assignors to Standard Oil Development Company, a corporation of Delaware No Drawing. Application May 14, 1948, Serial No. 27,148

11 Claims. (Cl. 260—604)

This invention relates to preparation of alkenals. It has to do, more specifically, with the direct catalytic oxidation of olefins to unsaturated aldehydes.

Many attempts have been made to produce unsaturated aldehydes, such as acrolein, by the dehydration of glycerol, and by catalytic dehydrogenation or catalytic oxidation of unsaturated alcohols, such as allyl alcohol. These methods have not proved to be commercially successful because of high production costs.

It has been previously reported that propylene can be oxidized to acrolein either by the use of aqueous mercuric acid sulfate solution or by the use of metal selenites or tellurites promoted with metallic oxides. The use of mercuric sulfate as a catalyst is expensive since stoichiometric proportions in relation to the acrolein produced must be used involving considerable cost in handling and reoxidation. The use of metal selenites and tellurites is objectionable because of the injurious physiological characteristics of these compounds and because of the necessity for regeneration from time to time. Also, there is considerable loss of selenium during the reaction.

One of the objects of this invention is to provide a commercially practicable method for oxidizing olefinic hydrocarbons directly to the corresponding unsaturated aldehydes. Another object of this invention is to provide a method of the type indicated in the preceding paragraph which is of such a nature that excessive oxidation of the olefin to carbon dioxide and water, or other undesirable end products, is reduced to a minimum, thereby resulting in correspondingly high yields of unsaturated aldehydes.

Still another object of this invention is to provide a catalyst which does not have any objectionable physiological characteristics, is reasonbly cheap and does not require regeneration until after use for long periods of time.

According to this invention, it has been found possible to oxidize olefinic hydrocarbons having the formula

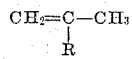

where R is hydrogen or an alkyl group, directly to the corresponding unsaturated aldehydes by passing mixtures of the said hydrocarbons and air, or gases containing molecular oxygen, over silica gel impregnated with copper compounds, at elevated temperatures. By proper control, excessive oxidation of the olefin to carbon dioxide and water, or other undesirable end products, may be reduced to a minimum, resulting in correspondingly high yields of unsaturated aldehydes.

The invention is particularly adapted to the oxidation of propylene to acrolein and isobutylene to methacrolein. The amount of oxygen used is above that theoretically required for the reaction. The preferred air hydrocarbon ratio is about 90/10, although various ratios of air to olefin may be used dependent upon the particular olefin to be reacted and the conversion desired. If pure oxygen is employed, ratios as high as 90% olefin to 10% oxygen may be employed. Other diluents than nitrogen, such as steam, paraffinic hydrocarbons, such as methane, ethane, propane, or the like, may be employed.

The catalyst which has been found to provide the advantages of the present invention is silica gel impregnated with copper compounds, such as copper oxide or copper phosphate. Other copper compounds, such as cuprous sulfate, cupric sulfate, and copper metallates may also be used. Copper oxide is one of the preferred copper compounds. Promoters, such as metallic oxides may also be used. Cadmium oxide and barium oxide have been found particularly suitable. Other promoters which have been tested are: lead oxide, beryllium oxide, chromium oxide, cobalt oxide, magnesium oxide, manganese oxide, molybdenum oxide, nickel oxide, potassium oxide, tin oxide, titanium oxide, uranium oxide, and vanadium oxide. The oxides of thallium, lanthanum, iron, cerium and thorium may also be used.

The ratio of the copper compound to the silica gel may vary over a wide range, although 2 to 30% copper compound, the percentage being largely based on the physical state of the gel when the copper compound is incorporated, appears most suitable.

The copper compound may be impregnated on purified silica hydrogel or on dry silica gel. For example, a heat-treated granular silica gel may be wetted with a solution of the desired copper compound, and activated at the desired temperature or a washed silica hydrogel may be homogenized as in a ball mill with the copper compound, the mixture dried and activated.

Following is the general procedure to be followed when preparing a catalyst starting with hydrogel: A silica hydrogel is prepared, freed of reaction salts and placed in a homogenizer such as a ball mill. To this hydrogel is added an amount of a copper nitrate solution sufficient to give the concentration of copper oxide desired. The mass is rotated until the product is completely uniform in texture. It is then placed in a drier held at about the boiling point of water and until most of the water has been removed and the product shows a uniform green glassy structure. These particles are then screened to the mesh desired, say 4–12 mesh, placed in a muffle furnace and brought slowly up to about 325° C. to 450° C. and held at this temperature until the oxides of nitrogen have been driven off. The material is then further heated to complete the activation. Usually three temperatures of activation are studied 1000° F., 1250° F., and 1400° F. The catalyst, now in its active form, is placed in the catalyst unit and is ready for testing.

The following procedure is followed when starting with dried silica gel: A dried granular silica gel, previously heated to at least 1000° F. to avoid decrepitation thereby preserving the mesh, is just moistened with a solution of copper nitrate using a sufficient concentration and volume to give the percentage copper oxide desired for the catalyst. The mass is then dried, heated to 375° C.–450° C. to decompose the nitrate and remove the oxides of nitrogen and finally heated to 1000° F. to 1400° F. to activate. The catalyst is then ready for use.

The operating temperature is dependent primarily upon the particular olefin being oxidized. Operating temperatures above 450° C. usually tend to temporarily impair the catalyst activity due to the excessive formation of combustion products while temperatures below about 175° C. are usually insufficient to carry out the oxidation. Temperatures of 200–400° C. have been found practical for the oxidation of propylene to acrolein although the preferred range is 250–320° C. In the oxidation of isobutylene to alpha methacrolein, the preferred reaction temperature is lower than that in the case of propylene. In all cases, the temperature must be accurately controlled to prevent excessive oxidation to water and carbon dioxide. A convenient method for securing this control is to jacket the catalyst chamber and partially fill the jacket with a liquid boiling at about the desired reaction temperature. Either a bed-type or fluid-type unit or some modification of the latter may be used with equal success. From an operating viewpoint some modification of a fluid system is preferred because of the ease of controlling operating variables, particularly temperature.

The oxidation of the olefin may be run intermittently or continuously. Also, this oxidation may be carried out without the addition of extraneous air or other oxidizing gases. In this case, the oxygen needed for the reaction comes directly from the metal oxide or oxides present in the catalyst itself.

Diluent gases such as steam, nitrogen and carbon dioxide may be used in order to increase acrolein selectivity. Hydrocarbons other than olefins are also not attacked under reaction conditions and serve as suitable diluents.

The process may be run at partial or high conversions. At partial conversions recycling of unchanged olefin to the reactor may be desirable with some prior venting of gas.

Occasionally and more particularly after abnormally high operating temperatures have been used there is some deposit of resinous matter or carbon deposited on the catalyst. This deposit coats off the active catalyst thereby reducing its activity. At this point the catalyst is regenerated by cutting off the gas being treated and passing air over the catalyst until this carbonaceous matter is removed. The temperature of the treatment should be preferably about 400°–500° C. Following this regeneration treatment the mass is cooled to operating temperature and the feed reintroduced. As before stated, this regeneration is usually necessary only after abnormal operation. When proper operating conditions are used the catalyst will last for a month or more before regeneration is necessary.

The process is not dependent upon any particular method of recovery of the useful products of the oxidation. The product may be recovered by chilling the reaction products in a condenser cooled by means of solid carbon dioxide. The acrolein is recovered by fractionation, boiling point +52.5° C. Higher boiling aldehydes may be recovered in a like manner. The crude aldehyde may be oxidized and recovered as an acid or selectively hydrogenated to either the saturated or unsaturated alcohol and recovered by standard methods.

EXAMPLE I

Air and propylene were mixed in a ratio of 90/10 and passed at atmospheric pressure, over silica gel impregnated with copper oxide. A feed rate of 250 volumes of feed per volume of catalyst per hour was employed. Samples for yields and conversion were collected after three days on stream and the following results were obtained:

*Table I.—Catalytic oxidation of propylene to acrolein—once through CuO impregnated silica gels*

| Percent CuO in Catalyst | Ap. Dens., Base Gel | Temp. of Activation, °F. | Bath Temp., °C. | Conv., Mol Percent | Selectivity, Mol Percent | Yield of Acrolein per Pass | |
|---|---|---|---|---|---|---|---|
| | | | | | | Mol Percent | Wt. Percent |
| 10 | .56 | 1,250 | 308 | 47 | 41 | 20.4 | 27.2 |
| 2 | .70 | 1,400 | 302 | 58 | 42 | 24.2 | 32.2 |

EXAMPLE II

Example I was repeated in case of the catalyst containing 10% cupric oxide and run for a period of eighteen days without catalyst regeneration. Conversion, selectivity, and yield per pass data are given in Table II for the last five days of operation. It may be noted that the selectivity to acrolein remained practically constant during this period.

*Table II.—Catalyst behavior vs. time on stream; 10% CuO impregnated on silica hydrogel; 250 v./v./hr., 10% propylene in air*

| Time on stream in days | 14 | 15 | 16 | 17 | 18 |
|---|---|---|---|---|---|
| Bath, °C | 288 | 291 | 293 | 294 | 294 |
| Conversion in mol percent | 47 | 46 | 47 | 46 | 49 |
| Selectivity in mol percent | 42 | 43 | 42 | 42 | 40 |
| Acrolein yield per pass mol percent | 20 | 19.8 | 19.6 | 19.5 | 19.5 |
| Acrolein yield per pass wt. percent | 26.6 | 26.4 | 26.1 | 26.0 | 26.0 |

EXAMPLE III

When isobutylene is substituted for propylene, methacrolein is obtained. In a run using 10% cupric oxide impregnated on silica hydrogel (activated at 677° C.) and using a 90/10 ratio of air and isobutylene, a conversion of 42% was obtained at a temperature of 261° C., with a molar selectivity of 27% to methacrolein.

EXAMPLE IV

The oxidation of an olefin to an unsaturated aldehyde, as is demonstrated by the oxidation of propylene to acrolein, is very peculiar to a silica gel or a gel predominating in silica as is evidenced in the following table (Table III). A number of standard carriers were impregnated with copper oxide. These carriers include various silicas of a more or less porous nature as pumice and filtros as well as three gels, $Al_2O_3$, $TiO_2$ and $ZrO_2$, commensurate in adsorptive properties with $SiO_2$ gel. An examination of the experimental data shows that it is not the chemical nature of the carrier nor is it the adsorptive properties that are responsible but it is a combination of the two.

*Table III*

| Carrier | Percent CuO in Cat. | Bath Temp., °C. | Conv., Mol percent | Selectivity, Mol percent | Yield of Acrolein | |
|---|---|---|---|---|---|---|
| | | | | | Mol percent | Wt. percent |
| Adsorbent MgO | 10 | 300 | 15.0 | 0.0 | 0.0 | 0.0 |
| Tabular $Al_2O_3$ | 5 | 300 | .9 | 7.0 | 0.6 | 0.8 |
| $Al_2O_3$ Gel | 10 | 235 | 12 | 8.0 | 1.0 | 1.3 |
| Asbestos | 20 | 318 | 19 | 4.0 | 0.7 | 0.9 |
| Filtros | 10 | 342 | 5 | 0.0 | 0.0 | 0.0 |
| Magnesol | 10 | 289 | 37 | 6.0 | 2.2 | 2.9 |
| Pumice | 10 | 302 | 3.2 | 0.0 | 0.0 | 0.0 |
| Act. Carbon | 10 | 210 | 10 | 0.0 | 0.0 | 0.0 |
| $TiO_2$ Gel | 10 | 222 | 19 | 5.2 | 1.1 | 1.9 |
| $ZrO_2$ Gel | 10 | 196 | 42 | 0.0 | 0.0 | 0.0 |

It will be apparent from the above description that an economical and commercially practicable method has been provided for oxidizing olefinic hydrocarbons directly to the corresponding unsaturated aldehydes. It will also be apparent that high yields of unsaturated aldehydes are obtained when using the catalyst of this invention.

Various other advantages will be apparent from the preceding description and the following claims.

What is claimed is:

1. The process of preparing an unsaturated aldehyde which comprises passing an olefinic hydrocarbon having the formula $$CH_2=C-CH_3$$
$$|$$
$$R$$

where R is selected from the group consisting of hydrogen and a methyl radical at a temperature of from 175° C. to 450° C., together with gases containing molecular oxygen over a catalyst consisting of silica gel impregnated with a copper compound containing essentially cupric oxide.

2. The process of preparing an unsaturated aldehyde which comprises passing an olefinic hydrocarbon having the formula $$CH_2=C-CH_3$$
$$|$$
$$R$$

where R is selected from the group consisting of hydrogen and a methyl radical at a temperature of from 175° C. to 450° C., together with air over a catalyst consisting of silica gel impregnated with a copper compound containing essentially cupric oxide.

3. The process according to claim 2 wherein the catalyst is at a temperature of from 200° C. to 400° C.

4. The process of preparing an unsaturated aldehyde which comprises passing an olefinic hydrocarbon having the formula $$CH_2=C-CH_3$$
$$|$$
$$R$$

where R is selected from the group consisting of hydrogen and a methyl radical at a temperature of from 175° C. to 450° C., together with gases containing molecular oxygen over a catalyst consisting of silica gel impregnated with cupric oxide, said catalyst having been prepared by mixing together silica hydrogel and cupric nitrate, initially heating the resulting mixture and further heating the mixture at temperatures of 1000° F. to 1400° F. to complete the activation.

5. The process of preparing an unsaturated aldehyde which comprises passing an olefinic hydrocarbon having the formula $$CH_2=C-CH_3$$
$$|$$
$$R$$

where R is selected from the group consisting of hydrogen and a methyl radical at a temperature of from 175° C. to 450° C., together with air over a catalyst consisting of silica gel impregnated with cupric oxide, said catalyst having been prepared by initially heating the resulting mixture at temperatures of 375° C. to 450° C., and further heating the mixture at temperatures of 1000° F. to 1400° F. to complete the activation.

6. The process according to claim 5 wherein the catalyst is at a temperature of from 200° C. to 400° C.

7. The process of preparing acrolein which comprises reacting propylene and oxygen at a temperature of from 200° C. to 400° C. in the presence of a catalyst consisting of silica gel impregnated with cupric oxide.

8. The process of preparing methacrolein which comprises reacting isobutylene and oxygen at a temperature of from 200° C. to 400° C. in the presence of a catalyst consisting of silica gel impregnated with cupric oxide.

9. The process of preparing acrolein which comprises reacting propylene and an oxygen-containing gas in the presence of a catalyst consisting of silica gel impregnated with cupric oxide at a temperature of from 250° C. to 320° C.

10. The process according to claim 1 in which the amount of oxygen used is above that theoretically required for oxidizing the hydrocarbon to the unsaturated aldehyde.

11. The process for preparing an unsaturated aldehyde which comprises passing an olefinic hydrocarbon selected from the group consisting of propylene and isobutylene together with gases containing molecular oxygen over a catalyst consisting of silica gel impregnated with cupric oxide at a temperature between 250° and 350° C.

GERALD C. CONNOLLY.
DELMER L. COTTLE.

REFERENCES CITED

The following references are of record in the file of this patent:

UNITED STATES PATENTS

| Number | Name | Date |
|---|---|---|
| 2,066,622 | Hasche | Jan. 5, 1937 |
| 2,186,688 | Walker | Jan. 9, 1940 |
| 2,383,711 | Clark et al. | Aug. 28, 1945 |
| 2,451,485 | Hearne et al. | Oct. 19, 1948 |